United States Patent [19]

Higgins

[11] Patent Number: 5,562,588
[45] Date of Patent: Oct. 8, 1996

[54] PROCESS FOR THE IN SITU BIOREMEDIATION OF CR(VI)-BEARING SOLIDS

[75] Inventor: Thomas E. Higgins, Reston, Va.

[73] Assignee: Maxus Energy Corporation, Dallas, Tex.

[21] Appl. No.: 366,458

[22] Filed: Dec. 30, 1994

[51] Int. Cl.$^6$ .................................. C02F 1/62; C12P 1/04
[52] U.S. Cl. ........................ 588/256; 405/128; 455/262.5
[58] Field of Search ............................ 405/128; 588/249, 588/256–17; 435/262, 262.5, 264

[56] References Cited

U.S. PATENT DOCUMENTS

| | | | |
|---|---|---|---|
| 4,504,321 | 3/1985 | Kapland et al. | 588/256 |
| 4,898,827 | 2/1990 | Brierley et al. | 435/264 X |
| 5,062,956 | 11/1991 | Lupton et al. | 210/611 |
| 5,155,042 | 10/1992 | Lupton et al. | 588/256 X |
| 5,202,033 | 4/1993 | Stanforth et al. | 405/128 X |
| 5,225,340 | 7/1993 | Nghiem et al. | 435/264 X |
| 5,302,287 | 4/1994 | Losack | 405/128 X |
| 5,336,290 | 8/1994 | Jermstad | 405/128 X |
| 5,397,478 | 3/1995 | Pal et al. | 588/256 |

*Primary Examiner*—Tamara L. Graysay
*Assistant Examiner*—Frederick L. Lagman
*Attorney, Agent, or Firm*—Burns, Doane, Swecker & Mathis

[57] ABSTRACT

Provided is a process for the treatment of Cr(VI)-bearing solids or soil by the in situ biological reduction of Cr(VI) to insoluble Cr(III). The pH of the Cr(VI)-bearing solids are adjusted with an acid or base to a pH of about 6.5 to 9.5, and thoroughly mixed in situ mixed with an organic material (such as manure) containing bacteria and nutrients.

8 Claims, No Drawings

PROCESS FOR THE IN SITU BIOREMEDIATION OF CR(VI)-BEARING SOLIDS

BACKGROUND OF THE INVENTION

1. Field of the Invention

The present invention is a process for the in situ bioremediation of chromium (VI) (Cr(VI))-bearing solids, including soils, sediments and wastes. In particular, the present invention relates to a process for the in situ treatment of Cr(VI)-bearing solids wherein Cr(VI) is bioremediated to Cr(III) without the need for removal of the solids from their resting place.

2. Description of the Related Art

Much effort is being expended on remediation of waste disposal sites contaminated with Cr(VI) in many localities across the country. These Cr(VI)-bearing solids potentially pose a health threat as compared with the low toxicity of Cr(III)-bearing solids.

One type of Cr(VI)-bearing waste is the residue produced by a typical chromite ore roasting process, in which a portion of the Cr(III) in chromite ore is oxidized to Cr(VI) by roasting in a kiln and then water-soluble Cr(VI) salts are extracted from the roasted ore. The chromite ore processing residue (COPR) contains Cr(VI), due to incomplete leaching, and is usually highly alkaline, due to the use of lime (CaO) in the roasting process.

It is typical for Cr(VI) to be present in COPR at concentrations ranging from 10,000 to 20,000 mg/kg, and the Cr(VI) fraction of the total Cr is generally in the range from 1% to 13%. However, when COPR has been mixed with other materials, it is common that the Cr(VI) concentration in the mixture, as a fraction of the total chromium concentration, varies widely.

Cr(VI) salts are very soluble in water, in comparison to Cr(III), which precipitates as a hydroxide at neutral and alkaline pH. Cr(VI) is actually present as a negative ion (anion) in water as opposed to Cr(III) which is a positive ion (cation). Anions are usually more highly mobile in soils than cations, which are exchanged with other cations in soils. The result is that Cr(VI) tends to be quite soluble and mobile and Cr(III) tends to be relatively insoluble and immobile. Conversion of Cr(VI) to Cr(III) has the benefit of greatly reducing the migration potential of the chromium in the environment.

Biological reduction of Cr(VI) to Cr(III) has been demonstrated in the laboratory and in the field. In a report of research to The Engineering Foundation & American Society of Civil Engineers in 1979, Higgins reported on the biological reduction of Cr(VI) to Cr(III) and subsequent removal from a wastewater stream. The researcher utilized laboratory soil columns to investigate the movement of heavy metals to groundwater when treated wastewater containing Cr(VI) and Cd was applied to agricultural soils for irrigation. The investigator found that initially the Cr(VI) percolated freely through the soil columns, but that with time, the Cr(VI) concentrations in the percolate decreased. Significant bacterial growth was noted on the surface of the columns. Chromium removal was postulated to be due to the biological reduction of Cr(VI) to Cr(III) followed by either precipitation of the hydroxide or adsorption or both. Food for bacterial growth was supplied by the residual biological oxygen demand (BOD) in the percolating water.

U.S. Pat. No. 5,155,042 to Lupton et at., relates to the bioremediation of Cr(VI)-bearing solids, specifically COPR. In the process, Cr(VI) is leached from the solids by injecting an acidic solution into the solids at one location and removing the leachate from a second location for treatment in an external biological reactor to which is added sulfate-reducing anaerobic bacteria, sulfates and other nutrients, as needed for the growth of the bacteria. In the reactor, Cr(VI) is biologically reduced to Cr(III) which is then precipitated as a hydroxide and removed from solution using solids separation processes. Acid is then added to the sulfate-reducing anaerobic bacteria-laden solution to maintain a pH of 6.5 to 9.5 and the solution is recirculated into the Cr(VI)-bearing solids to promote in situ reduction and leaching of the remaining Cr(VI). It was noted that COPR exhibited an "alkaline rebound" effect where after the addition of sufficient acid to reduce the pH to the range of 6.5 to 9.5, the pH slowly rose to above 9.5, due to the slow release of alkalinity from the COPR. They noted that the soluble Cr(VI) concentration in the COPR must be less than 200 mg/l and the pH stabilized before a self-sustaining population of sulfate-reducing anaerobic bacteria could be maintained in situ. They therefore proposed a process in which multiple applications of acid and sulfate-reducing anaerobic bacteria are necessary, and in which external treatment of the leachate in a biological reactor is used to reduce the Cr(VI) to Cr(III).

U.S. Pat. No. 5,285,000 to Schwitzgebel is directed to the in situ chemical treatment of Cr(VI) contaminated soil. The method first uses a ferrous iron containing solution to reduce Cr(VI) to Cr(III) and coprecipitate the resulting $Fe(OH)_3$ and $Cr(OH)_3$ with other heavy metals. A sodium silicate gel-forming solution is added to reduce leaching of the metals.

U.S. Pat. No. 5,304,710 to Kigel et al. relates to an ex situ process for chemically treating chromium ore waste-contaminated soils by acidification, chemical reduction, neutralization and stabilization. The method includes the steps of soil grinding, acidification to a pH less than or equal to 3, reduction of Cr(VI) to Cr(III) using a ferrous iron salt, raising the pH with an alkaline agent such as lime, precipitating the chromium and iron as hydroxides, and if needed to improve physical strength, stabilizing the mixture by adding cement, cement kiln dust, fly ash, slag or other agents.

U.S. Pat. No. 5,202,033 to Stanforth et al. is directed to the in situ chemical treatment of Cr(VI) contaminated soil. The method of treating solid waste in soil or solid waste containing unacceptable concentrations of chromium includes mixing the waste or soil in situ with ferrous sulfate. The method consists of adding ferrous sulfate and a pH controlling agent such as magnesium oxide, magnesium hydroxide, calcium oxide or calcium hydroxide, to the soil or waste, and mixing under conditions which support reactions that will convert the chromium to a non-leachable form. The treatment additives can be introduced and contacted with the soil or waste by the following techniques: spreading the additives on top of the soil or waste and mixing with a mechanical device, such as a rotary tiller; adding the treatment chemical through an infiltration gallery as a solution or slurry; injecting a soluble additive through injection nozzles or injection wells; and, adding a treatment additive through a hollow-shaft auger and mechanical mixing.

Methods which involve treatment of Cr(VI)-bearing solids by percolating acid through the media suffer from two deficiencies: the acids react with the solids to significantly reduce the hydraulic permeability of the media therefore limiting the ability to continue to percolate treatment materials; and, the acid reacts with the first solid material it comes in contact with, producing a lower than desirable pH in the pore water near the point of injection and higher than desirable pH away from the point of injection. The result would be a significant variation in pH of the media, with little of the media at the desired pH range of 6.5 to 9.5.

Likewise, percolation is an inefficient method of distributing bacteria into a Cr(VI)-bearing solids media. The tendency will be for the bacteria to be removed by filtration in the media. Bacteria that are not filtered out would tend to be single cells (to avoid the filtration effects of the media) and would be exposed to high concentrations of Cr(VI), reducing the number of viable bacteria that could be injected through percolation.

U.S. Pat. No. 5,155,042 to Lupton et at., is limited to the use of sulfate reducing bacteria for Cr(VI) reduction. One of the patent holders, Defilipi, in "Bioremediation of Hexavalent Chromium in Water, Soil and Slag Using Sulfate Reducing Bacteria", a preprint from *Handbook of Process Engineering for Pollution Control and Waste Minimization,* ed. by D. L. Wise and D. J. Tratolo, determined that sulfate reducing bacteria produce $H_2S$, which then reacts with Cr(VI) to reduce it to Cr(III), which then precipitates as chromic hydroxide. One potential problem with this process is the generation of $H_2S$, a toxic gas.

Other researchers have demonstrated that bacteria other than those that are sulfate reducing are effective at reducing Cr(VI) to Cr(III). Higgins demonstrated that the bacteria present in the effluent from a domestic wastewater treatment plant would reduce Cr(VI).

Blake et al in "Chemical Transformation of Toxic Metals by a Pseudomonas Strain from a Toxic Waste Site", *Environmental Geochemistry and Health,* Vol. 15, No. 2, 1993, studied the bacterium *Pseudomonas maltophilia.* Their tests demonstrated that "the reduction of Cr(VI) was catalyzed by a membrane-bound chromate reductase". Ohtake and Hardyo's tests of *Enterobacter cloacae* found that the bacterium anaerobically reduced Cr(VI) at the cell surface. The reduced chromium then precipitated as an insoluble metal hydroxide. Their tests also indicated that the most favorable pH for the reaction was 7. See, "New Biological Method for Detoxification and Removal of Hexavalent Chromium", *Water Science and Technology,* Vol. 25, No. 15, 1992.

Accordingly, it is an object of the present invention to provide an effective and efficient method for the in situ biological reduction of Cr(VI)-bearing solids by in-place mechanical mixing with organic nutrients, naturally occurring bacteria, and mineral acid or bases without excavation of the solids.

These and other objects of the present invention will become apparent upon review of the following specification and the claims appended thereto.

SUMMARY OF THE INVENTION

In accordance with one aspect of the present invention, there is provided a method for the in situ bioremediation of Cr(VI)-bearing solids without removal of the material or soil from the ground.

In accordance with another aspect of the present invention, there is provided a method for the in situ bioremediation of Cr(VI)-bearing solids wherein the Cr(VI) is reduced to Cr(III) such that the Cr(VI) concentration in the solids is reduced to below the methods detection limit using a standard test method.

More specifically, the method of the present invention comprises adding organic material, naturally occurring bacteria, and a sufficient amount of a mineral acid or base and water to Cr(VI)-bearing solids to sustain the mixture pH between 6.5 and 9.5, and then thoroughly mixing in situ to promote the biological reduction of the Cr(VI) to Cr(III).

Among other factors, the present invention is based upon the recognition that bioremediation of Cr(VI)-bearing solids can be successfully and efficiently achieved in situ, without the need for leaching to reduce the concentration of Cr(VI) in the solids or the use of cultured sulfate reducing bacteria as is required in prior art bioremediation processes. By thoroughly mixing into the site material the organic material containing bacteria and sufficient mineral acid or base to sustain the pH to between 6.5 and 9.5, it has been found that the Cr(VI) is reduced to Cr(III) within the treated volume. Cr(VI)-bearing solids such as COPR and mixtures containing COPR can thereby be more efficiently and easily remediated via a biological process than has heretofore been possible using other processes.

DETAILED DESCRIPTION OF PREFERRED EMBODIMENTS

The present invention relates to a process for the in situ bioreduction of Cr(VI)-bearing solids without removal of the material from the ground or compromising its current use. In the process, treatment materials are mixed into the Cr(VI)-containing material. Treatment materials include bacteria, nutrients, organic materials, and acid or base if needed to establish a pH conducive for bacterial growth (typically between 6.5 and 9.5).

Suitable sources of bacteria and organic material include manure, peat, wastewater treatment sludge, and the like. These materials contain a large population of diverse bacteria (particularly *Escherichia coli,* which has been found to be effective at Cr(VI) reduction). The semi-solid nature of these organic materials provides some protection for the bacteria against the potentially toxic effects of Cr(VI) in the pore water of Cr(VI)-bearing solids. In addition, the semi-solid nature of these materials provides a long-term reservoir of organic materials for the bacteria to use where reduction of Cr(VI) to Cr(III) is to take place over an extended time period.

Groundwater flow in the treatment area can be controlled in a manner to provide suitable moisture to promote bacterial growth.

In the bioreduction process of the present invention, the following occurs: The Cr(VI) in the solids dissolves and migrates to the interparticle fluid-filled pores. Sufficient organic material, nutrients and bacteria are provided in the pores to effect bioreduction of Cr(VI) and other easily reduced compounds.

Suitable conditions are maintained in the Cr(VI)-bearing solids for biological activity, including adjustment of the pH to between 6.5 and 9.5, the addition of sufficient moisture, and the provision of sufficient nutrients such as nitrogen and phosphorus.

With respect to the bioreduction process of the present invention, the Cr(VI)-bearing solids are characterized to determine the amount of mineral acid or base needed to achieve a long-term pH of between 6.5 to 9.5 in the material to provide conditions suitable for bacterial propagation.

In general, the method of the present invention involves the following procedure.

Mineral acid or base, sufficient to adjust the long-term pH of the treated mixture to the range of 6.5 to 9.5, water and an organic material, such as manure, peat or wastewater treatment sludge, are applied in situ to Cr(VI)-bearing solids to enhance the biodegradation process and effect the reduction of Cr(VI) to Cr(III). To speed up the bioreduction process, ferrous sulfate may be added as an option. Successful bioreduction requires that the pH of the material be maintained between 6.5 and 9.5 after equilibrium conditions have been established. The treatment materials are thoroughly mixed with the Cr(VI)-bearing solids in situ to establish a uniform consistency. The mixing can be accomplished by any suitable means, including, for example, a hollow-shaft auger, filler or other suitable mechanical mixer.

In the method of the present invention, the Cr(VI)-bearing solids or soil is physically mixed in place with the reactants and the ground serves as the reactor. This allows bioremediation and Cr(VI) reduction to be applied to large volumes of Cr(VI)-bearing solids without the need for excavation of the Cr(VI)-bearing solids and subsequent physical grinding of the material to facilitate a more rapid reaction time in an onsite or nearby treatment plant.

Effective bioremediation and Cr(VI) reduction at a site can be verified by the following procedure. Water samples can be taken from the soil or material and analyzed for Cr(VI), pH and total microbial population (by plate count method) to monitor progress of the bioremediation process. Representative samples of the mixed solids of the soil or material can be taken and analyzed for total Cr and Cr(VI), and a mass balance performed, to verify that Cr(VI) conversion to Cr(III) and conservation of the total Cr have occurred.

The invention will be illustrated in greater detail by the following examples. These examples are given by way of illustration and are not meant to limit the disclosure or the claims to follow. Percentages in the example, and elsewhere in the specification, are by percent dry weight of material per dry weight of Cr(VI)-bearing solids unless otherwise specified.

EXAMPLE 1

The invention was tested on chromite ore processing residue. The composition of the COPR and the treatment materials is shown in Table 1.

1. COPR material was thoroughly mixed and sieved through a ½ inch sieve to homogenize the samples and remove debris.
2. Samples of COPR were mixed with varying amounts of tap water, sulfuric acid, ferrous sulfate, fresh manure, composted manure and peat.
3. The mixture was transferred to a 6-inch diameter column approximately a foot deep.
4. Water was added to the column to saturate the mixture.
5. Liquid samples were taken from a bottom tap and analyzed for Cr(VI), pH and total microbial population (by plate count method).
6. Samples of the mixed solid were taken and analyzed for nutrients (nitrogen and phosphorus), COD, and total and Cr(VI).
7. Columns were sealed and stored at room temperature (approximately 20° C.). Columns were opened for sampling and reseated.
8. Each month, water samples were drained from the column and analyzed for Cr(VI), pH and microbial population. The height of the water in the columns was monitored and water was added to maintain saturation. Columns were opened and solid samples collected and analyzed for, total and Cr(VI).

Test conditions for the column tests are listed in Table 2. A mixture of peat and composted manure was tested to determine the effectiveness of these biologically stabilized materials as compared with fresh manure. Ferrous sulfate was added to Columns C1 and C2 to determine if an initial reduction of Cr(VI) would be needed to reduce the potential chromium toxicity to bacteria and enhance the bioreduction process.

TABLE 1

Composition of COPR and Treatment Materials

| Material | Total Cr | Cr (VI) | Total P (mg/kg) | TKN | COD | Total Solids % | pH |
|---|---|---|---|---|---|---|---|
| Composted Manure | 15 | 10 | 8,600 | 2 | 735,000 | 48 | 8.6 |
| Fresh Manure | 25 | <30 | 9,780 | 23,000 | 1,430,000 | 14.1 | — |
| Peat | 27 | 8 | 250 | 10,700 | 1,150,000 | 62.8 | 4.4 |
| COPR | 7,970 | 3,520 | 250 | 300 | 34,000 | 80.8 | 11.1 |

The following procedure was employed:

TABLE 2

| Column | Initial COPR (lbs.) | Sulfuric Acid (ml) | Water (liters) | Peat[1] (%) | Composted Manure[1] (%) | Fresh Manure[1] (%) | Ferrous Sulfate[2] (%) | Ferrous Sulfate (g) |
|---|---|---|---|---|---|---|---|---|
| | | | | Initial Conditions for Column Bioreduction Testing | | | | |
| C0 | 16 | 100 | 2.0 | 0.0 | 0.0 | 0.0 | 0 | 0 |
| C1 | 16 | 75 | 2.0 | 0.0 | 0.0 | 0.0 | 50 | 115 |
| C2 | 16 | 75 | 3.0 | 3.0 | 3.0 | 3.0 | 50 | 115 |
| C3 | 16 | 100 | 4.0 | 5.0 | 5.0 | 0.0 | 0 | 0 |
| C4 | 16 | 100 | 3.0 | 3.0 | 3.0 | 3.0 | 0 | 0 |
| C5 | 16 | 100 | 4.0 | 5.0 | 0.0 | 5.0 | 0 | 0 |

[1]Mass used as a percentage of the mass of COPR
[2]Amount used as a percentage of the stoichiometric requirement In testing the process of the present invention on the COPR Cr(VI)-bearing solids, the pHs of samples were adjusted with sulfuric acid to initial pHs of 5.6 to 8.1. (Table 3) In one month the pHs had stabilized to between 7.8 and 9.4. These tests demonstrated that the long-term pH of COPR Cr(VI)-bearing solids can be adjusted to the optimal range for bioreduction of Cr(VI) by a single addition of mineral acid.

TABLE 3

| Column | Start | 1 mo. | 2 mo. | 3 mo. | 4 mo. | 5 mo. | 7 mo. | 9 mo. | 11 mo. |
|---|---|---|---|---|---|---|---|---|---|
| | | | Colunm Study Pore Water pHs | | | | | | |
| C0 | 6.8 | 7.7 | 7.7 | 7.7 | 7.8 | 8.0 | 7.9 | NM | 7.6 |
| C1 | 5.6 | 7.6 | 8.1 | 8.1 | 7.8 | 7.7 | 7.5 | 7.5 | 7.5 |
| C2 | 7.6 | 8.7 | 9.1 | 9.2 | 9.4 | 9.6 | NM | NM | 8.8 |
| C3 | 7.0 | 7.5 | 8.7 | 8.9 | 9.0 | 8.8 | 8.0 | 8.1 | 8.7 |
| C4 | 7.6 | 8.6 | 9.2 | 9.3 | 9.4 | 9.7 | 9.5 | 9.3 | 8.5 |
| C5 | 8.1 | 8.9 | 9.3 | 8.7 | 9.1 | 9.0 | 8.6 | 8.9 | 8.4 |

NM = Not Measured

Table 4 shows that bacterial cultures can be developed and maintained in the COPR when various mixtures of manure and peat are applied to the material and the pH adjusted to the optimal range (pH 6.5 to 9.5). C0 and C1, which had no organic supplement, both started with low populations. All columns with manure (composted or fresh) started with healthy bacterial populations. These populations tended to decrease during the first couple of months and then increased, possibly because the bacteria needed to acclimate to a high concentration of Cr(VI) in the COPR. C4 had a much later recovery. This column also had the highest pH (it was greater than 9 for most of the study period), which reinforces the conclusion that high pH is more of a toxicity factor than Cr(VI). The column with the greatest dose of fresh manure (C5) developed the best bacterial culture. C2 also developed a healthy bacterial culture, even though the pH also peaked at 9.3.

TABLE 4

| Column | Start | 1 mo. | 2 mos. | 3 mos. | 4 mos. | 5 mos. | 7 mos. | 9 mos. | 11 mo. |
|---|---|---|---|---|---|---|---|---|---|
| | | | Column Study Pore Water Plate Counts (CFU*/ml) | | | | | | |
| C0 | <29 | 37,500 | 4,700 | 31,800 | 16,400 | 1 | 60,000 | 22,800 | 7,700 |
| C1 | <10 | 15,900 | 1,200 | 53,000 | 278,000 | 3,000 | 147,000 | 30,000 | 34,600 |
| C2 | 5,600 | 28,200 | 2,230 | 207,000 | 131,000 | 22,500 | 168,000 | 78,400 | 850 |
| C3 | 9,900 | 2,100 | 109 | 430 | 18,600 | 46 | 1,090 | 258,000 | 2,400 |
| C4 | 31,000 | 12,100 | 1,090 | 3,600 | 450 | 430 | 400 | 251,000 | 24,400 |
| C5 | >300,000 | 3,100 | 1,100 | >300,000 | 118,000 | 26,000 | 377,000 | 166,000 | 10,800 |

*CFU is an abbreviation for Colony Forming Unit.

Table 5 shows the concentrations of Cr(VI) in the pore water and Table 6 shows the total Cr(VI) in the solid phase of the columns. The control column (C0) data shows basically no change over the period of the test. This demonstrates that although a reduction in pH promoted a moderate bacterial growth, this did not result in a significant reduction of Cr(VI) in the COPR.

All of the organically treated samples showed an immediate and significant reduction in pore water Cr(VI). The pore water in columns C3 and C5 (Table 5) decreased to less than the detection limit of 0.01 mg/l after four months and remained non-detectable for the rest of the time. The pore water in column C2 decreased to less than the detection limit after 7 months, but was slightly greater than the detection limit after one year. One of the columns (C4) lagged the other columns, due to its higher pH and the resulting low bacterial population. After one year the pore water Cr(VI) remained near or below the detection limit. After one year, all of the solid-phase Cr(VI) concentrations (Table 6) from the supplemented columns were less than 100 mg/kg and all but C4 were less than the detection limit of 20 mg/kg. In the previous samples, collected after nine months, the solid-phase Cr(VI) concentrations in columns C2 and C5 were less than lower detection limits of 6 and 8 mg/kg, respectively.

TABLE 5

Column Study Pore Water Cr(VI) Concentration (mg/l)

| Column | Start | 1 mos. | 3 mos. | 4 mos. | 5 mos. | 7 mos. | 11 mos. | 12 mos. |
|---|---|---|---|---|---|---|---|---|
| C0 | 1,390 | 1,210 | 1,460 | 1,360 | 1,390 | 1,360 | 1,270 | 1,300 |
| C1 | 216 | 462 | 689 | 630 | 660 | 640 | 560 | 650 |
| C2 | 309 | 795 | 40 | 2.79 | 0.13 | <0.01 | 0.02 | 0.02 |
| C3 | 505 | 647 | 18 | <0.01 | <0.01 | <0.01 | <0.01 | <0.01 |
| C4 | 837 | 782 | 188 | 101 | 51 | 17.3 | 2.37 | 0.16 |
| C5 | 629 | 608 | 5 | <0.01 | <0.01 | <0.01 | <0.01 | <0.01 |

TABLE 6

Column Study Solid Phase Cr(IV) Concentrations (mg/kg)

| Column | Start | 1 mo. | 3 mos. | 4 mos. | 5 mos. | 7 mos. | 9 mos. | 11 mos. |
|---|---|---|---|---|---|---|---|---|
| C0 | 2,750 | 2,620 | 2,670 | 2,400 | 2,100 | 2,400 | 1,800 | 2,200 |
| C1 | 982 | 1,770 | 1,700 | 1,700 | 1,500 | 1,700 | 900 | 1,800 |
| C2 | 917 | 988 | 163 | 145 | 80 | 20 | <6 | <20 |
| C3 | 1,490 | 936 | 429 | 58 | 15 | <10 | 46 | <20 |
| C4 | 1,530 | 1,580 | 915 | 250 | 67 | 60 | 61 | 70 |
| C5 | 1,770 | 885 | 419 | 28 | <8 | <10 | <8 | <20 |

This test demonstrated the technical feasibility of the proposed method of in-situ bioreduction of Cr(VI)-bearing solids. The pH of Cr(VI)-bearing solids can be adjusted to the optimal range for bacterial activity (6.5 to 9.5) by the one-time addition of a mineral acid or base. Addition of organic materials (various mixtures of fresh and composted manure, and peat with nutrients) provided a suitable population of bacteria and suitable environment for their propagation. It has been demonstrated that these bacteria can acclimate to Cr(VI) concentrations in excess of 2,000 mg/kg, and that these bacteria will reduce the Cr(VI) concentration in Cr(VI)-bearing solids. Adding ferrous sulfate resulted in a faster Cr(VI) reduction in comparison with treatment organic materials alone.

EXAMPLE 2

Cr(VI)-bearing solids to be treated may first be tested to determine the appropriate amounts of additives required for Cr(VI) reduction of Cr(VI)-bearing solids. Acid or base requirements can be determined by acid or base titration of representative samples of the Cr(VI)-bearing solids. Organic material requirements, i.e., fresh manure or composted manure and/or peat, can be determined using laboratory columns, or field pilot testing.

The typical application rates for additives are expected to be less than 5% manure and less than 2% mineral acid or base to Cr(VI)-bearing solids on a dry weight basis. The treatment area may be divided into separate treatment zones to facilitate use of different amounts of treatment additives, if needed. Once the amount of additive per area is determined, the additives are applied and mixed with the Cr(VI)-bearing solids. The application of additives and the mixing of them with the Cr(VI)-bearing solids may be performed using a hollow-shaft auger or an "eggbeater"-like device, such as are used for in situ mixing of pozzolonic materials for stabilization/solidification, to simultaneously apply the additives at different depths and thoroughly mix the additives with the Cr(VI)-bearing solids. For Cr(VI)-bearing solids that are near the surface, agricultural implements, such as plows or tillers may be used to mix the additives with the Cr(VI)-bearing solids.

Utilization of the present invention can achieve effective Cr(VI) reduction of a site in a relatively uncomplicated and expedient fashion. The in situ bioremediation embodied in the present process achieves the reduction of Cr(VI), foregoing the prior art excavation and chemical treatment, which can afford the potential user many benefits. Once a site has been treated in accordance with the in situ process of the present invention, the material can be left in situ in the ground containing the less toxic and less mobile Cr(III) valence state.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for the in situ bioreduction of Cr(VI)-bearing solids comprising:

adding to the Cr(VI)-bearing solids a solid or semi-solid organic material containing bacteria, nutrients, a sufficient amount of mineral acid or base to maintain the mixture to a pH between 6.5 and 9.5, and water, and thoroughly mixing the Cr(VI)-bearing solids and additives in place without removal to another location to thereby effect a complete biochemical reduction of Cr(VI) to Cr(III) in situ.

2. The process of claim 1, wherein said organic material comprises manure (fresh or composted), peat, wastewater treatment sludge, or mixture thereof.

3. The process of claim 1, further comprising the control of ground water flow in a treatment area to ensure suitable moisture content for biological growth.

4. The process of claim 1, wherein said adding and mixing are performed by a hollow-shaft auger, an "eggbeater"-like device, or an agricultural implement.

5. The process of claim 4, wherein the agricultural implement is a plow or tiller.

6. The process of claim 4, wherein the mixing is achieved using a hollow-shaft auger.

7. The process of claim 1, wherein the bacteria comprises *Escherichia coli*.

8. A process for the in situ bioreduction of Cr(VI)-bearing solids comprising:

analyzing the Cr(VI)-bearing solids to be treated to determine the appropriate amounts of additives required for Cr(VI) biochemical reduction, adding to the Cr(VI)-bearing solids the determined amounts of solid or semi-solid organic material containing bacteria, nutrients, mineral acid or base, and water to reduce the mixture to a pH between 6.5 and 9.5, and thoroughly mixing the Cr(VI)-bearing solids and additives without removal to another location to effect a complete biochemical reduction of Cr(VI) to Cr(III) in situ.

* * * * *